United States Patent
Söderlund

(10) Patent No.: US 7,483,723 B2
(45) Date of Patent: Jan. 27, 2009

(54) FLEXIBLE CONDUCTORS CONNECTED BETWEEN TWO PARTS OF A PORTABLE ELECTRONIC DEVICE

(75) Inventor: Marcus Söderlund, Stockholm (SE)

(73) Assignee: Sony Ericsson Mobile Communications AB (SE)

( * ) Notice: Subject to any disclaimer, the term of this patent is extended or adjusted under 35 U.S.C. 154(b) by 111 days.

(21) Appl. No.: 10/535,033
(22) PCT Filed: Nov. 20, 2003
(86) PCT No.: PCT/EP03/13000

§ 371 (c)(1),
(2), (4) Date: May 13, 2005

(87) PCT Pub. No.: WO2004/046900

PCT Pub. Date: Jun. 3, 2004

(65) Prior Publication Data

US 2006/0018102 A1 Jan. 26, 2006

Related U.S. Application Data

(60) Provisional application No. 60/429,268, filed on Nov. 26, 2002.

(30) Foreign Application Priority Data

Nov. 21, 2002 (EP) .................................. 02025987

(51) Int. Cl.
*H04M 1/00* (2006.01)
(52) U.S. Cl. ................ 455/575.1; 455/575.3; 455/90.3; 340/825.44
(58) Field of Classification Search ............. 455/575.1, 455/575.3, 90.3; 439/31; 379/433.13; 16/221, 16/354, 286; 361/683; 396/157; 348/373; 340/825.44
See application file for complete search history.

(56) References Cited

U.S. PATENT DOCUMENTS 5,278,725 A * 1/1994 Konno et al. ................ 361/680

(Continued)

FOREIGN PATENT DOCUMENTS

EP 0 898 405 A2 2/1999

(Continued)

OTHER PUBLICATIONS

EPO Office Action for Application No. 02-025-987.5-1525; dated Aug. 23, 2006.

(Continued)

*Primary Examiner*—Duc Nguyen
*Assistant Examiner*—April S Guzman
(74) *Attorney, Agent, or Firm*—Myers Bigel Sibley & Sajovec, P.A.

(57) ABSTRACT

The present invention is directed towards a portable electronic device that includes a first part and a second part. The first part includes electrical circuits and has an exterior side, an interior side, and a bottom side. The second part includes electrical circuits and has an exterior side, and interior side and a bottom side. At least one hinge connects the bottom sides of the first and second parts to each other and allows rotation of one part in relation to the other. At least one first set of flexible electrical conductors are connected to the first part on the exterior side adjacent the bottom side thereof and connected to the second part on the interior side adjacent the bottom side thereof. The first part may be a camera having a lens on the interior side thereof, and the second part may be a display provided on the interior side thereof.

17 Claims, 4 Drawing Sheets

U.S. PATENT DOCUMENTS

| | | | | |
|---|---|---|---|---|
| 5,363,089 | A * | 11/1994 | Goldenberg | 340/7.63 |
| 5,732,331 | A | 3/1998 | Harms | |
| 5,927,997 | A | 7/1999 | Ruland et al. | |
| 5,966,777 | A * | 10/1999 | Jantschek | 16/354 |
| 5,987,704 | A * | 11/1999 | Tang | 16/354 |
| 6,266,236 | B1 | 7/2001 | Ku et al. | 361/681 |
| 6,344,977 | B1 * | 2/2002 | Takagi | 361/814 |
| 6,466,202 | B1 * | 10/2002 | Suso et al. | 345/169 |
| 6,519,812 | B2 * | 2/2003 | Ko et al. | 16/354 |
| 6,728,557 | B1 * | 4/2004 | Tracy et al. | 455/575.3 |
| 6,754,514 | B1 * | 6/2004 | Nakamura | 455/575.3 |
| 6,798,649 | B1 * | 9/2004 | Olodort et al. | 361/683 |
| 6,900,981 | B2 * | 5/2005 | Kuivas et al. | 361/683 |
| 6,990,355 | B2 * | 1/2006 | Ueyama et al. | 455/550.1 |
| 7,016,712 | B2 * | 3/2006 | Newman et al. | 455/575.3 |
| 7,130,591 | B2 * | 10/2006 | Iwai et al. | 455/90.3 |
| 2001/0051510 | A1 | 12/2001 | Nakamura | |
| 2001/0055384 | A1 | 12/2001 | Yamazaki et al. | 379/419 |
| 2002/0135993 | A1 * | 9/2002 | Ueyama et al. | 361/814 |
| 2003/0112588 | A1 * | 6/2003 | Shimano | 361/683 |
| 2003/0112589 | A1 * | 6/2003 | Shimano et al. | 361/683 |
| 2003/0112590 | A1 * | 6/2003 | Shimano et al. | 361/683 |
| 2003/0228847 | A1 * | 12/2003 | Matsumoto | 455/90.3 |
| 2004/0198474 | A1 * | 10/2004 | Jung et al. | 455/575.1 |
| 2004/0212956 | A1 * | 10/2004 | Kuivas et al. | 361/683 |
| 2005/0079901 | A1 * | 4/2005 | Tracy et al. | 455/575.3 |
| 2005/0239520 | A1 * | 10/2005 | Stefansen | 455/575.1 |
| 2005/0261040 | A1 * | 11/2005 | Andersson et al. | 455/575.3 |
| 2006/0007648 | A1 * | 1/2006 | Wang | 361/683 |
| 2006/0034601 | A1 * | 2/2006 | Andersson et al. | 396/157 |
| 2006/0227102 | A1 * | 10/2006 | Finke-Anlauff et al. | 345/156 |

FOREIGN PATENT DOCUMENTS

| | | |
|---|---|---|
| EP | 1 175 070 A1 | 1/2002 |
| EP | 1 178 647 | 2/2002 |
| EP | 1 259 048 A2 | 11/2002 |
| WO | WO 01/84269 | 11/2001 |

OTHER PUBLICATIONS

International Preliminary Examination Report for PCT/EP03/13000.
International Search Report for PCT/EP03/13000.

* cited by examiner

FLEXIBLE CONDUCTORS CONNECTED BETWEEN TWO PARTS OF A PORTABLE ELECTRONIC DEVICE

RELATED APPLICATIONS

The present application is a 35 U.S.C. §371 national phase application of PCT International Application No. PCT/EP2003/013000, having an international filing date of Nov. 20, 2003, and claiming priority to European Patent Application No. 02025987.5, filed Nov. 21, 2002, and U.S. Provisional Application No. 60/429,268, filed Nov. 26, 2002, the disclosures of which are incorporated herein by reference in their entireties. The above PCT International Application was published in the English language and has International Publication No. WO 2004/046900 A2.

TECHNICAL FIELD OF THE INVENTION

The present invention relates to the field of portable electronic devices and more particularly to the electrical interconnection between two parts of the device rotatable round each other as well as to the provision of image captioning units and displays on such rotatable devices.

DESCRIPTION OF RELATED ART

It is within the field of portable electronic devices becoming more and more common to provide the device with electrical circuits in two parts rotatably coupled to each other, in order to keep the device small while at the same time allowing it to be doubled in size when in use. Within the field of cellular phones there are a number of phones existing often being called clamshell phones, where this term is describing of the way the phones are opened. In some of these devices one half or the lid of the device might include a display, while the other or main part includes a keypad for entering data and phone numbers. In order to electrically connect the two halves to each other, there is provided a flex film with connecting leads. The flex film is here in one known example provided from the middle of one half to the middle of a second half, with the flex film being provided in a round loop within the hinge, so that the film cannot be seen. One phone model having this type of structure is the model P2102 V Foma sold by NTT DoCoMo in Japan.

Another device having a flex film is shown in U.S. Pat. No. 6,307,751. This document describes a foldable portable computer having a display in one foldable part and a CPU in another foldable part. Flex film is provided for electrical contact between different parts of the computer in the interior of the device and within the hinge.

It is often desirable to provide a portable electronic device in which the parts can be rotated with approximately 360 degrees in relation to each other, i.e. so that both the inner and outer sides of the two parts of the device can be provided against each other for easier holding in a hand of the user. This is not possible to provide with the flex film solution in the phone model P2102V Foma. When done with the solution in U.S. Pat. No. 6,307,751 there would be considerable stress to the flex film.

U.S. Pat. No. 4,878,293 describes a calculator having a clam shell type of construction, where a first part can be rotated by close to 360 degrees in relation to a second part. The device has a hinge provided along most of the length of two long sides of the two parts and flexible conductors interconnecting the two parts are provided from the interior of one part to the interior of the other part via the interior of the hinge. The conductors are here provided along most the length of the hinge and when one part of the calculator is rotated in relation to the other, the conductors are subject to torsional stress because of the rotational movement. This is no real problem in the described device because the calculator has a long side where the hinge is provided. This solution is however not very usable if the hinge is short or when the side of the hinge is short, because the torsional stress might get too big with the breaking of the flex film as a possible result.

There is thus a need for providing an alternative way of providing electrical contact between two parts of a portable electronic device that can be rotated by approximately 360 degrees and that reduces the stress on the electrical connection.

SUMMARY OF THE INVENTION

The present invention is therefore directed towards solving the problem of providing an alternative way to provide an electrical connection between two parts of a portable electronic device rotatable in relation to each other, that reduces the stress on the electrical connection and that occupies little space in the portable communication device.

One object of the present invention is thus directed towards providing a portable electronic device providing electrical connection between two parts that are rotatable in relation to each other, that limits the stress especially at large rotation angles and where the electrical connection occupies little space in the device.

According to a first aspect of the present invention, these objects are achieved by a portable electronic device comprising:
- a first part including electrical circuits and having an exterior side, an interior side, and top and bottom sides,
- a second part also including electrical circuits and also having an exterior side, an interior side and top and bottom sides,
- at least one hinge connecting the bottom sides of the first and second parts to each other and allowing rotation of one part in relation to the other, and
- at least one first set of flexible electrical conductors connected to the first part at the exterior side adjacent the bottom side thereof and to the second part at the interior side adjacent the bottom side thereof.

A second aspect of the present invention includes the features of the first aspect, wherein the hinge allows rotation of one part with approximately 360 degrees in relation to the other part.

A third aspect of the present invention includes the features of the first aspect, wherein the first set of electrical conductors stretches round the bottom side of the first part when the device is folded.

A fourth aspect of the present invention includes the features of the third aspect, wherein the first set of flexible electrical conductors stretches round the bottom side of the second part when a part is rotated with approximately 360 degrees in relation to the other part.

A fifth aspect of the present invention includes the features of the first aspect, wherein the set of conductors are essentially provided at right angles to both the bottom sides.

Another object of the present invention is to provide a set of flexible electrical conductors, which is easier to replace if being faulty.

This object is achieved by a sixth aspect of the present invention including the features of the first aspect, wherein the first set of flexible electrical conductors is separate from the hinge structure of the device.

Another object of the present invention is to provide electrical connection between the two parts, which makes the use of a gear unnecessary for stabilizing rotation.

This object is achieved by a seventh aspect of the present invention including the features of the first aspect, further including a second set of flexible electrical conductors connected to the second part at the exterior side adjacent the bottom side thereof and to the first part at the interior side adjacent the bottom side thereof.

An eighth aspect of the present invention includes the features of the seventh aspect, wherein the second set of flexible electrical conductors stretch round the bottom side of the second part when the device is folded.

A ninth aspect of the present invention includes the features of the first aspect, wherein both the bottom sides have a rounded shape.

A tenth aspect of the present invention includes the features of the first aspect, wherein both the bottom sides are provided with at least one groove for receiving a set of flexible electrical conductors.

An eleventh aspect of the present invention includes the features of the first aspect, wherein one of the parts is provided with gears at its bottom side and the other part is provided with gaps, with which the gears mesh.

A twelfth aspect of the present invention includes the features of the first aspect, wherein the at least one hinge is provided in the form of a plate comprising two sections each defining an axis of rotation displaced from the other in the plane of the plate and each section has a protrusion on both sides in the middle of an area defining the axis.

A thirteenth aspect of the present invention includes the features of the twelfth aspect, wherein each part is provided with a slit for receiving a section of the hinge and each slit is provided with cavities on both sides within the interior of a part for receiving the protrusions of said section for securing the hinge in said part.

A fourteenth aspect of the present invention includes the features of the first aspect, wherein a set of flexible electrical conductors is provided in the form of a flex film.

A fifteenth aspect of the present invention includes the features of the first aspect, wherein a set of flexible electrical conductors is provided as a cable comprising a number of wires.

A sixteenth aspect of the present invention includes the features of the first aspect, wherein the first part includes an image captioning unit having a lens on the interior side and the second part includes a display provided on the interior side.

A seventeenth aspect of the present invention includes the features of the first aspect, wherein the portable electronic device is a cellular phone.

Another object of the present invention is to provide a portable electronic device, which allows an enhanced use of display and image captioning unit provided in the device, when one part of the device can be rotated with approximately 360 degrees in relation to the other part.

According to an eighteenth aspect of the present invention this object is achieved by a portable electronic device comprising:
  a first part including electrical circuits and having an exterior side, an interior side, and top and bottom sides,
  a second part also including electrical circuits and also having an exterior side, an interior side and top and bottom sides, and
  at least one hinge connecting the bottom sides of the first and second parts to each other and allowing rotation of one part in relation to the other with at least approximately 270 degrees,
  wherein the first part comprises an image captioning unit having a lens on the interior side and the second part comprises a display provided on the interior side.

A nineteenth aspect of the present invention includes the features of the eighteenth aspect, wherein the hinge allows rotation of one part in relation to the other with approximately 360 degrees.

A twentieth aspect of the present invention includes the features of the eighteenth aspect, wherein at least one first set of flexible electrical conductors are connected between the first part and the second part for providing electrical connection between electrical circuits of the first and second parts.

The present invention has many advantages, one being that the connection of the set of flexible connectors between the two parts gives an electrical connection on which applied stress is limited. The connection of a set of flexible electrical conductors is most advantageous when the two halves are rotated by approximately 360 degrees in relation to each other, although it is in no way required to rotate this much. Another advantage of the present invention is that it occupies little space in a portable communication device. Therefore this device can be made smaller, which is often desirable.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

The present invention relates to a portable electronic device comprising two parts and in a first embodiment of the present invention two halves with electronics in each part, where it might be of interest to rotate the two halves in relation to each other. In the following the invention will be described in relation to a cellular phone. It should however be realised that this is just one type of device in which the invention can be implemented. It can just as well be provided in other types of portable electronic devices such as a lap top computer, a palm top computer, an electronic organizer, a smartphone, a communicator, a calculator or a gaming machine.

Figure 1:
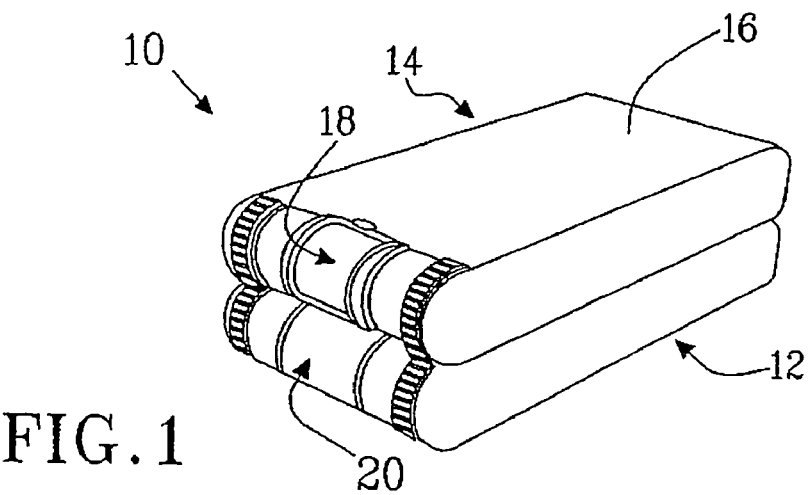
FIG. 1 schematically shows a perspective view of a clam shell phone according to the present invention in a folded position, FIG. 2 schematically shows a perspective view of the clam shell phone according to the present invention in a position when it is opened by approximately 135 degrees, FIG. 3 schematically shows a perspective view of the clam shell phone according to the present invention in a position when it is opened by approximately 315 degrees, FIG. 4 schematically shows an exploded perspective view of the clam shell phone according to the present invention in a position when it is opened by approximately 135 degrees, FIG. 5 schematically shows a side view of the clam shell phone according to a first variation of the present invention when it is in the folded position, FIG. 6 schematically shows a side view of the clam shell phone according to the first variation of the present invention when it is opened by approximately 360 degrees, FIG. 7 schematically shows a side view of the clam shell phone according to a second variation of the present invention when it is in the folded position, FIG. 8 schematically shows a side view of a clam shell phone according to the second variation of the present invention when it is opened by approximately 360 degrees.

FIG. 1 shows a perspective view of the phone 10 according to the invention. The phone includes a first half 12 which is provided with a top and bottom 20 side and an interior side and exterior side. The top and bottom sides are placed on opposite sides of each other as are the interior and exterior sides. The top and bottom sides are essentially provided at right angles to the interior and exterior sides. In the view the top, interior and exterior sides cannot be seen. The phone 10 also includes a second half 14 also having an exterior 16 and interior side as well as a top and bottom 18 side. The top and bottom sides are placed on opposite sides of each other, as are the interior and exterior sides. The top and bottom sides are essentially provided at right angles to the interior and exterior sides. In this view the top and interior sides cannot be seen. The bottom sides 18, 20 of the two halves 12, 14 are hingedly coupled to each other. In this view the phone is in a folded position, which means that the two interior sides are facing each other. Both the bottom sides have a rounded shape, which here is semicircular. The phone halves are joined together at these bottom sides and one half can be rotated in relation to the other. When the phone is in the folded position, units like keypads, display and camera, which are normally provided on the interior sides are protected from damage. Displays are often expensive and relatively vulnerable units, why this is of great advantage.

Figure 2:
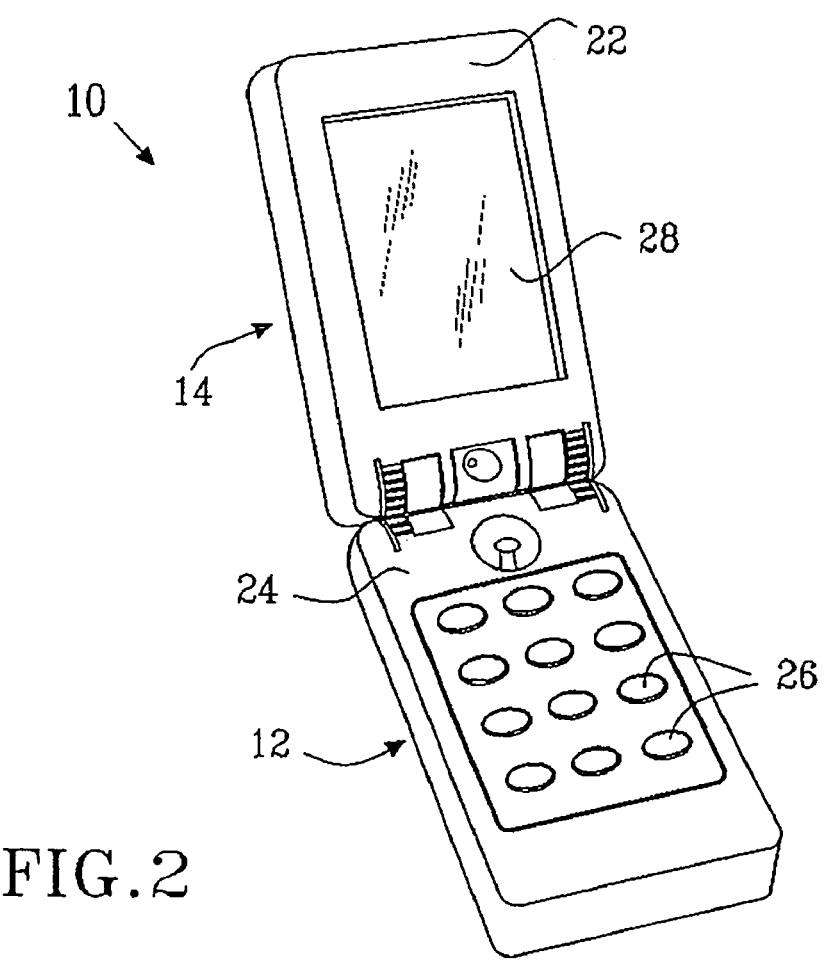

FIG. 2 shows another perspective view of the phone in FIG. 1. Here one half has been rotated with approximately 135 degrees in relation to the other half in order to open the phone. From this figure it can be seen that the first half 12 includes a keypad 26 on it's interior side 24 and that the second half 14 has a display 28 on it's interior side 22, which display is a touch screen. When the phone has been rotated into this position, it can be used for making telephone calls as well as to enter information via the keys on the keypad, which entries can be viewed on the display. It is however not suitable for entering data into the phone via the touch screen, since then the phone might tip over.

Figure 3:
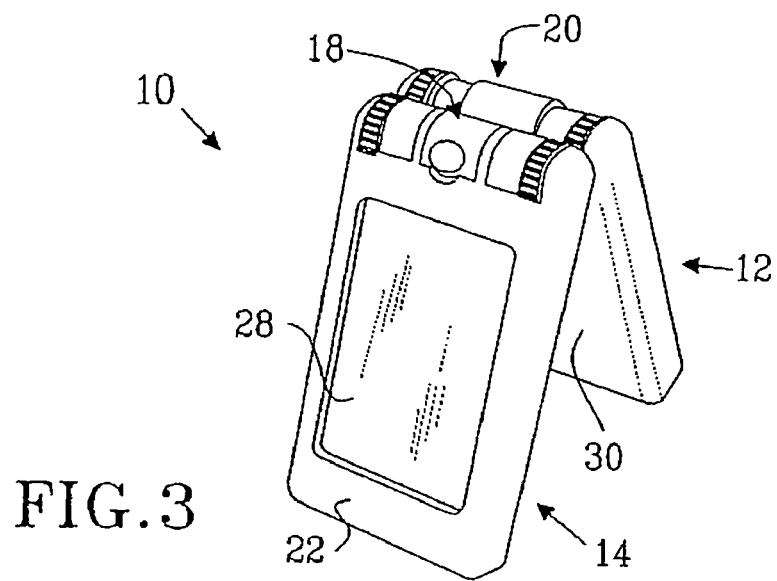

One half of the phone can be rotated with about 360 degrees in relation to the other half. In order to show this FIG. 3 shows a perspective view of the phone when one half has been rotated 245 degrees in relation to the other half. When this is done the interior sides are both made to face outwardly, while the exterior sides will face each other inwardly. This is done such that the phone can be used in a better way. When using the touch screen for entering data into the phone, it is much easier to do this if the halves have been rotated by 360 degrees so that the two exterior sides face each other. The phone is then much easier to hold in the hand and more stable than the phone would be if it was opened like in FIG. 2.

Figure 4:
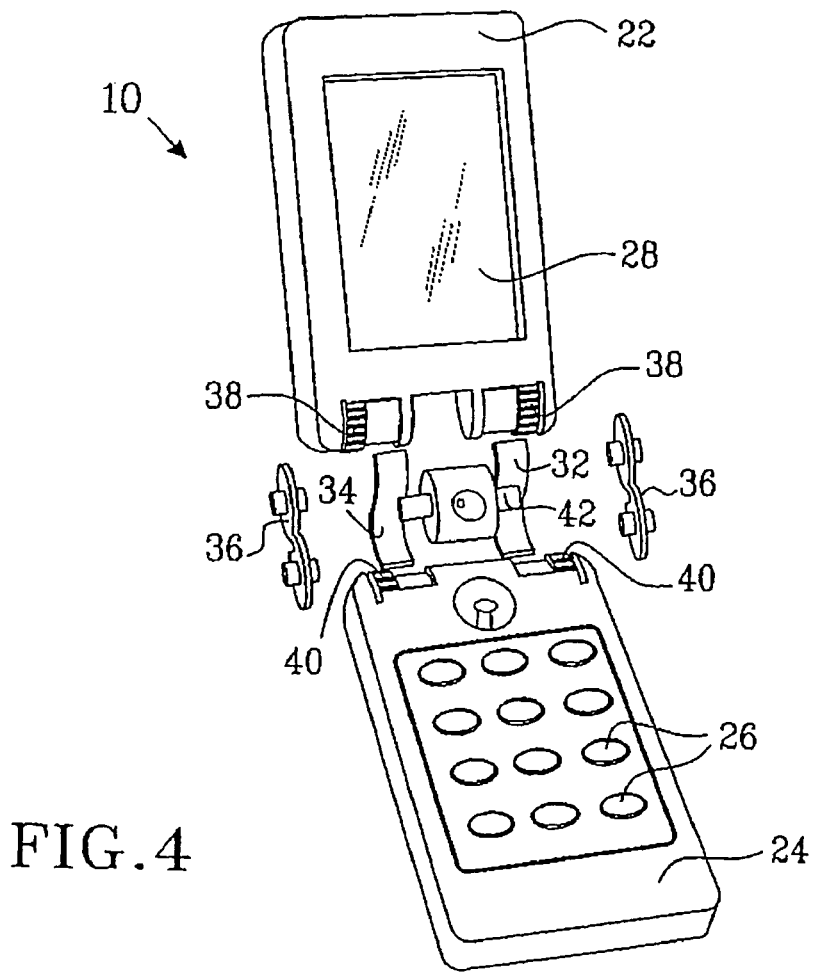

FIG. 4 shows an exploded perspective view of the phone in the position where one half is rotated with 135 degrees in relation to the other half. Between the two halves there are provided two sets of flexible electrical conductors 32 and 34 in the form of two strips of flex films 32 and 34 on which the conductors are provided. The conductors are insulated. This is normally done by moulding the film in a silicon material. Both the flex films are to be connected to the exterior side of the first part and to the interior side 22 of the second part such that they go round the exterior of the bottom side of the first part when the phone is folded. The phone also includes two hinges 36 allowing rotation of one half with approximately 360 degrees in relation to the other half. The hinges 36 are in the form of two plates having two sections each providing an axis of rotation for the device. In this device the sections are formed as two interconnected circles of equal radius. The hinges are adapted to be placed in slits in the first and second parts. The phone is furthermore provided with two gear wheels 38 provided in the bottom side of the second part, which wheels are arranged to mesh with corresponding gaps 40 provided in the first part. These gear wheels 38 make the rotation of one part in relation to the other more stable. They also make the rotation of a half round one axis be made simultaneously with the rotation of the other half round the other axis and thus provides a smoother folding and unfolding operation. The figure also shows an image captioning unit in the form of a digital camera 42 for provision in the second part as a part of the hinge structure. The camera 42 here rotates in synchronism with the second half. From the figure it can be seen that the set of flexible electrical conductors are provided separately from the hinge structure. The film is furthermore provided essentially at right angles to the bottom sides of the halves. Because of this it is easier to replace faulty flexible electrical conductors, without having to disassemble the hinge mechanism.

Figure 5:
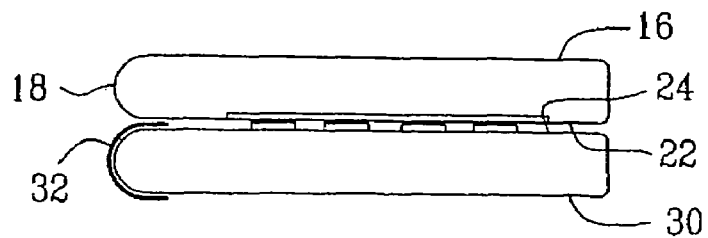
Figure 6:
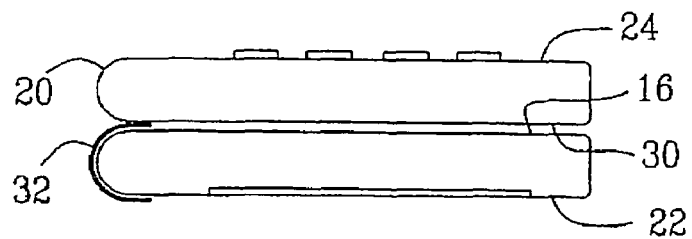

In order to better understand how the set of flexible electrical conductors are provided reference is now being made to FIGS. 5 and 6, which show two side views of the phone when in folded position (FIG. 5) and when one half of the phone has been rotated approximately 360 degrees in relation to the other half (FIG. 6). When the phone is folded the flex film is, as was mentioned earlier, in one end connected to the exterior side 30 of the first part and to the interior side 22 of the second part. Because of this the flex film runs round the bottom end 20 of the first part, when in this position. It is preferred to provide the film firm against this part in this position. The bottom end is preferably provided with a track for receiving the flex film. When the second part is rotated with about 360 degrees in relation to the first part for providing the interior side 24 of the first part and the interior side 22 of the second part to face outwardly, the flex film 32 is moved so that it now runs round the bottom end 18 of the second part. The second part is preferably provided with a groove for receiving the flex film. As can thus be seen the flex film will not be subjected to any particular tension, torsion or to an excessive bending when being rotated, which relieves a lot of the stress on the film that would otherwise be the result if the halves are being rotated by close to 360 degrees. With the rotation the flex film is thus made to move from running round the bottom side 20 of the first half to running round the bottom side 18 of the second half.

Figure 7:
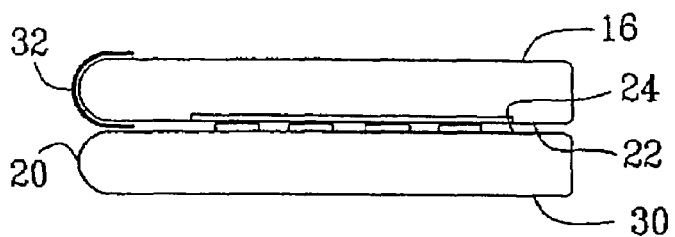
Figure 8:
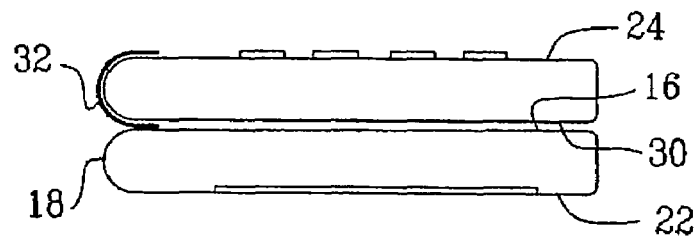

In FIG. 4 both of the flex films were mounted in the above-described way. As an alternative one or both of them can be mounted in the opposite way, which is shown in FIGS. 7 and 8, which figures show a side view of the two phone halves when folded (FIG. 7) and when rotated by approximately 360 degrees (FIG. 8). The difference here is that the flex film 32 is at one end connected to the interior side 24 of the first part and at its other end to the exterior side 16 of the second part. The flex film 32 therefore goes round the bottom end 18 of the second part when folded. When one part is rotated by approximately 360 degrees in relation to the other part, the flex film 32 thus moves such that it goes round the bottom end 20 of the first part instead. This solution therefore provides the same results as the first solution.

The phone described does not need to have two flex films. It can be provided with only one, which can be mounted as in FIGS. 5 and 6 or as in FIGS. 7 and 8. In this case it is preferable to have one gear wheel for providing a more stable rotation. As an alternative the phone can have two flex films, one mounted as described in FIGS. 5 and 6 and one mounted as described in FIGS. 7 and 8. When this latter solution is used, a gear will not be necessary in order to obtain stable rotation, but this is accomplished by the two flex films instead. It is of course also possible to have more flex films provided in the same way as described above. The gear does also not have to be provided as a separate wheel, but can be realised through stamping the gears into the plastic used for the casing of the half. The corresponding gaps can be provided in the same manner. There are also other variations possible. For instance the flexible electrical conductors do not have to be provided in the form of flex films, but can be in the form of cables or cords. Another possibility is to provide them in the form of insulated conducting polymers. It is furthermore not necessary to be able to rotate one half with the full approximately 360 degrees in relation to the other part to benefit from limited stress by the connection of the set of flexible conductors according to the invention, but smaller angles are also possible.

The described structure has several advantages. One is that undue stress on the set of flexible electrical conductors is limited because the flex film will not be bended or drawn in a dangerous way. The structure therefore avoids the breaking of the conductors. It is furthermore easier to replace a faulty set of flexible electrical conductors, since it is not provided within the hinge structure. The electrical conductors furthermore occupy less space in the portable electronic device than known conductors.

Figure 9:
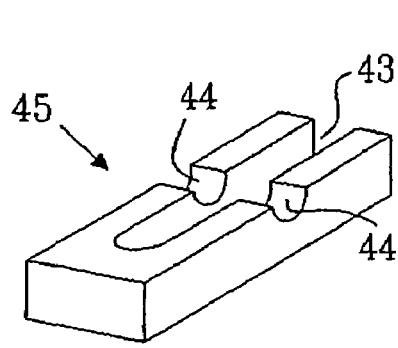
FIG. 9 shows a perspective view of a part of a hinge securing mechanism used in the clam shell phone.
Figure 10:
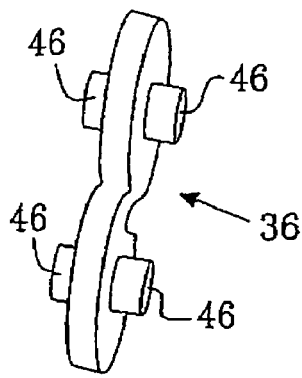
FIG. 10 shows a top view of the hinge used in the clam shell phone, FIG. 11 schematically shows a perspective view of a variation of the clam shell phone when it is opened by 180 degrees, and FIG. 12 schematically shows a perspective view of the variation of the clam shell phone when it is opened by 360 degrees.

The hinge structure and the way it is secured in a half of the phone will now be described with reference to FIGS. 9 and 10, where FIG. 9 shows a perspective view of half 45 of a securing mechanism and FIG. 10 a top view of the hinge 36. The securing mechanism includes a slit 43 on both sides of which is provided a cavity 44 formed after the shape of the protrusion and is in this case has a hollow tubular shape. The slit 43 is provided at a bottom side of a half of the phone. In FIG. 9 the lower half of a slit 43 is shown and the lower half of the corresponding cavities 44. In order to provide fastening of the hinge a corresponding upper half is provided on top of the half shown for providing the total hinge securing mechanism. The hinge 36 is in the form of a plate having two circular sections, where a protrusion 46 is provided on each side of a circular section and in the middle of such a section for defining an axis of rotation. The protrusions have tubular shape. As stated earlier the protrusion 46 associated with one circular section therefore provides one axis of rotation to be used by one half, while the protrusion associated with the other circular section provides another axis of rotation to be used by the other half. The protrusions of one section are to be provided in the cavity 44 of the securing mechanism of one half such that one circular section of the hinge is running in the slit 40 of the securing mechanism. The other circular section will be provided in a similar securing mechanism of the other half. The distance between the two axis of rotation and the positions of the cavities in the different halves are selected such that the bottom ends of the two halves touch or almost touch. Co-rotation round the two axis with the same angle is then also provided by the gears and corresponding gaps or the two sets of flexible conductors having opposite connection to each other.

With this structure rotation of the two parts up to approximately 360 degree is easily achieved.

Figure 11:
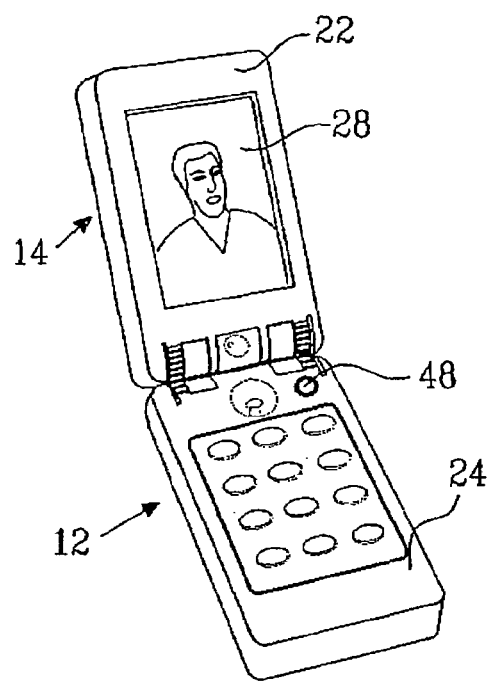
Figure 12:
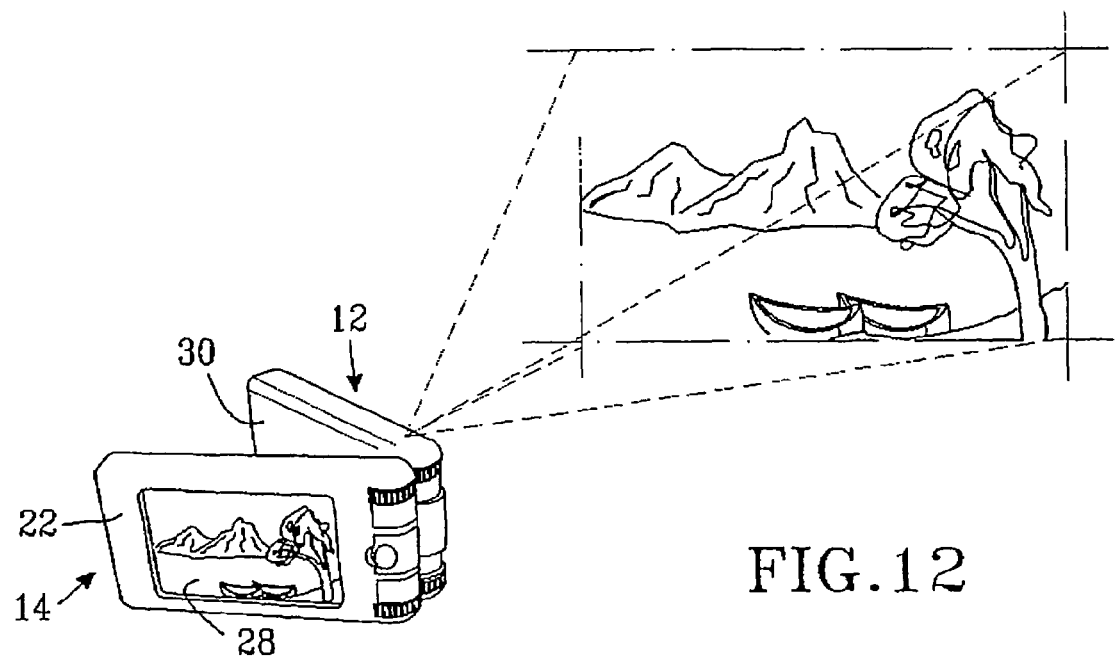

Finally one major application of the present invention will be described in relation to FIGS. 11 and 12 showing another embodiment of the present invention in perspective views. Here the camera is not provided in the hinge area, i.e. at the bottom side of a half of the phone, but is rather provided inside the first half 12 such that the lens 48 thereof. Is visible on the interior side 24 of the first part 12. When the phone is opened such that one part is rotated by approximately 180 degrees in relation to the other part, the display 28 provided on the interior side 22 of the second part 14 is provided side by side with the interior side of the first part. When the phone is in this position, it is possible to use for video conferencing such that the camera takes video shots of the user of the phone for sending to another party with which the user is communicating and the display shows video shots of the other party. Upon rotating a half to a position where it is rotated with approximately 360 degrees in relation to the other part, the two exterior sides are now facing each other, and the two interior sides are now both outwardly directed. Now the phone can be used as a camera in order to for instance take still pictures, where the display acts as a viewfinder.

The above-described embodiment thus results in a device that can be used both as a video conferencing device and as a regular camera by simply doing the appropriate rotation of the two parts in relation to each other. Naturally it can also be used as video camera in the position shown in FIG. 12 as well as be used with still pictures in the scenario of FIG. 11. This solution enables the use of the existing camera and display in two different applications without the user having to get extra modules or plug-in devices for obtaining the same results. It is furthermore not necessary to allow full rotation to approximately 360 degrees in order to be able to have this dual use. More than 180 degrees is necessary, though. It can for instance also work when being able to rotate with at least 270 degrees. The preferred possible rotation is however by the full approximately 360 degrees.

In order to be able to stop the rotation at some wanted positions for example at 135 degrees or 180 degrees, the bottom ends can be provided with locking devices which locks the halves of the phone in the desired positions. Suitable unlocking devices can also unlock these locking positions. Such locking and unlocking devices are well known within the art and will therefore not be further described.

There are more ways in which the invention can be varied. It is for instance possible to provide more parts, which can be rotatable round any of the two described halves. Therefore the invention is only to be limited by the accompanying claims.

The invention claimed is:

1. A portable electronic device comprising:
   a first part comprising electrical circuits and having an exterior side, an interior side, and top and bottom sides;
   a second part comprising electrical circuits and having an exterior side, an interior side and top and bottom sides;
   at least one hinge connecting the bottom sides of the first and second parts to each other and allowing rotation of one of the first and second parts approximately 360 degrees relative to the other of the first and second parts;
   a first set of flexible electrical conductors connected to the first part at the exterior side adjacent the bottom side thereof and connected to the second part at the interior side adjacent the bottom side thereof while the first and second parts have a defined rotational angle therebetween; and a second set of flexible electrical conductors connected to the second part at the exterior side adjacent the bottom side thereof and connected to the first part at the interior side adjacent the bottom side thereof while the first and second parts have the defined first rotational angle therebetween wherein the first and second sets of flexible electrical conductors are spaced apart on opposite sides of the hinge.

2. The portable electronic device according to claim 1, wherein the first set of electrical conductors stretches around the bottom side of the first part when the portable electronic device is folded.

3. The portable electronic device according to claim 2, wherein the first set of electrical conductors stretches around the bottom side of the second part when the first and second parts are rotated approximately 360 degrees relative to each other.

4. The portable electronic device according to claim 2, wherein the first set of conductors is at right angles to the bottom sides of the first and second parts.

5. The portable electronic device according to claim 2, wherein the first set of flexible electrical conductors is separate from the hinge structure of the portable electronic device.

6. The portable electronic device according to claim 1, wherein the second set of flexible electrical conductors stretch around the bottom side of the second part when the portable electronic device is folded.

7. The portable electronic device according to claim 1, wherein both the bottom sides of the first and second parts have a rounded shape.

8. The portable electronic device according to claim 2, wherein the bottom sides of the first and second parts have at least one groove therein that is configured to receive the first set of flexible electrical conductors.

9. The portable electronic device according to claim 1, wherein one of the parts comprises gears connected to its bottom side and the other of the parts is provided with gaps with which the gears mesh.

10. The portable electronic device according to claim 1, wherein the at least one hinge comprises a plate having two sections, each of the two sections of the plate having an axis of rotation that is displaced in the plane of the plate from the axis of rotation of the other of the two sections, and each of the two sections of the plate having a protrusion on opposite sides in a middle of an area of the section that corresponds to the axis of rotation.

11. The portable electronic device according to claim 10, wherein each of the parts has a slit configured to receive one of the sections of the plate, and each of the parts further defines cavities on opposite sides of the slit within the interior of the parts configured to receive the protrusions of the sections and to secure the hinge in the parts.

12. The portable electronic device according to claim 1, wherein the first set of flexible electrical conductors comprises a flex film.

13. The portable electronic device according to claim 1, wherein the first set of flexible electrical conductors comprises a cable having a plurality of wires.

14. The portable electronic device according to claim 1, wherein the first part comprises an image captioning unit having a lens on the interior side of the first part, and the second part comprises a display on the interior side-of the second part.

15. The portable electronic device according to claim 1, wherein the device comprises a cellular phone.

16. A portable electronic device comprising:

a first part comprising electrical circuits and having an exterior side, an interior side, and top and bottom sides;

a second part comprising electrical circuits and having an exterior side, an interior side and top and bottom sides;

at least one hinge connecting the bottom sides of the first and second parts to each other and allowing rotation of one of the first and second parts approximately 270 degrees relative to the other of the first and second parts;

a first set of flexible electrical conductors connected to the first part at the exterior side adjacent the bottom side thereof and to the second part at the interior side adjacent the bottom side thereof while the first and second parts have a defined rotational angle therebetween; and a second set of flexible electrical conductors connected to the second part at the exterior side adjacent the bottom side thereof and to the first part at the interior side adjacent the bottom side thereof while the first and second parts have the defined first rotational angle therebetween, wherein the first and second sets of flexible electrical conductors are spaced apart on opposite sides of the hinge, wherein the first part comprises an image captioning unit having a lens on the interior side of the first part, and the second part comprises a display on the interior side of the second part, and wherein the first and second set of flexible electrical conductors electrically connect the electrical circuits of the first and second parts.

17. The portable communication device according to claim 16, wherein the hinge allows rotation of one of the first and second parts approximately 360 degrees relative to the other of the first and second parts.

\* \* \* \* \*